United States Patent
Hsu

(10) Patent No.: US 6,712,567 B2
(45) Date of Patent: Mar. 30, 2004

(54) ARTICLE STEADYING BOARD

(75) Inventor: Mu-Chaun Hsu, Taipei (TW)

(73) Assignee: L & F Plastics Co., Ltd., Taipei (TW)

( * ) Notice: Subject to any disclaimer, the term of this patent is extended or adjusted under 35 U.S.C. 154(b) by 0 days.

(21) Appl. No.: 10/234,233

(22) Filed: Aug. 30, 2002

(65) Prior Publication Data

US 2004/0042866 A1 Mar. 4, 2004

(51) Int. Cl.⁷ .................................................. B60P 7/08
(52) U.S. Cl. ............................. 410/46; 410/35; 410/97
(58) Field of Search ............................ 410/34, 35, 46, 410/96, 97; 248/499; 108/55.5

(56) References Cited

U.S. PATENT DOCUMENTS 5,980,173 A * 11/1999 Danekas et al. ............. 410/99
6,065,916 A * 5/2000 Swensen ...................... 410/97
6,422,795 B2 * 7/2002 Holt et al. ................... 410/115
6,439,815 B1 * 8/2002 Liu .............................. 410/106
6,511,270 B1 * 1/2003 Burke et al. ................. 410/94
6,524,040 B1 * 2/2003 Heil ............................ 410/67

* cited by examiner

Primary Examiner—Stephen T. Gordon
(74) Attorney, Agent, or Firm—Alan Kamrath

(57) ABSTRACT

An article steadying board includes a board of a preset shape and size and having a plurality of through holes bored regularly or irregularly spaced apart. A plurality of elastic ropes each have two ends each connected with a hook to hook any of the through holes. The hooks may hook the through holes near the profile of an article placed on the board so that the article may be bound firmly by the rope. The board may be positioned on the ground of a warehouse for storing or on a vehicle for transporting.

2 Claims, 4 Drawing Sheets

ARTICLE STEADYING BOARD

BACKGROUND OF THE INVENTION

This invention relates to an article steadying board, particularly to an article steadying board to stably steady articles having a shape difficult to be steadied or to be carried on a running vehicle.

When articles of various shapes are to be steadied in an empty space in a house or warehouse, they have to be stopped or surrounded by large blocks of large weight placed on the ground so as to prevent the articles from moving around randomly or being moved by exterior force.

When articles of various shapes are to be transported by a running vehicle, they have to be bound by ropes or the like so as to prevent them from swaying, moving around randomly or falling off the vehicle. If binding ropes cannot be used, the articles have to be stopped or surrounded by large weights. But in case the vehicle is suddenly stopped, the articles may be moved or slide randomly by inertia, possibly causing damage.

SUMMARY OF THE INVENTION

This invention has been devised to offer an article steadying board for articles of various shapes and sizes, easily binding them on the surface of the board for storing in a warehouse or being transported on a running vehicle.

The feature of the invention is a board provided with a plurality of through holes arranged regularly or irregularly spaced apart, and a plurality of elastic ropes for stably binding articles on the board, and hooks respectively connected to two ends of each elastic rope for hooking the through holes near the profile of the article.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
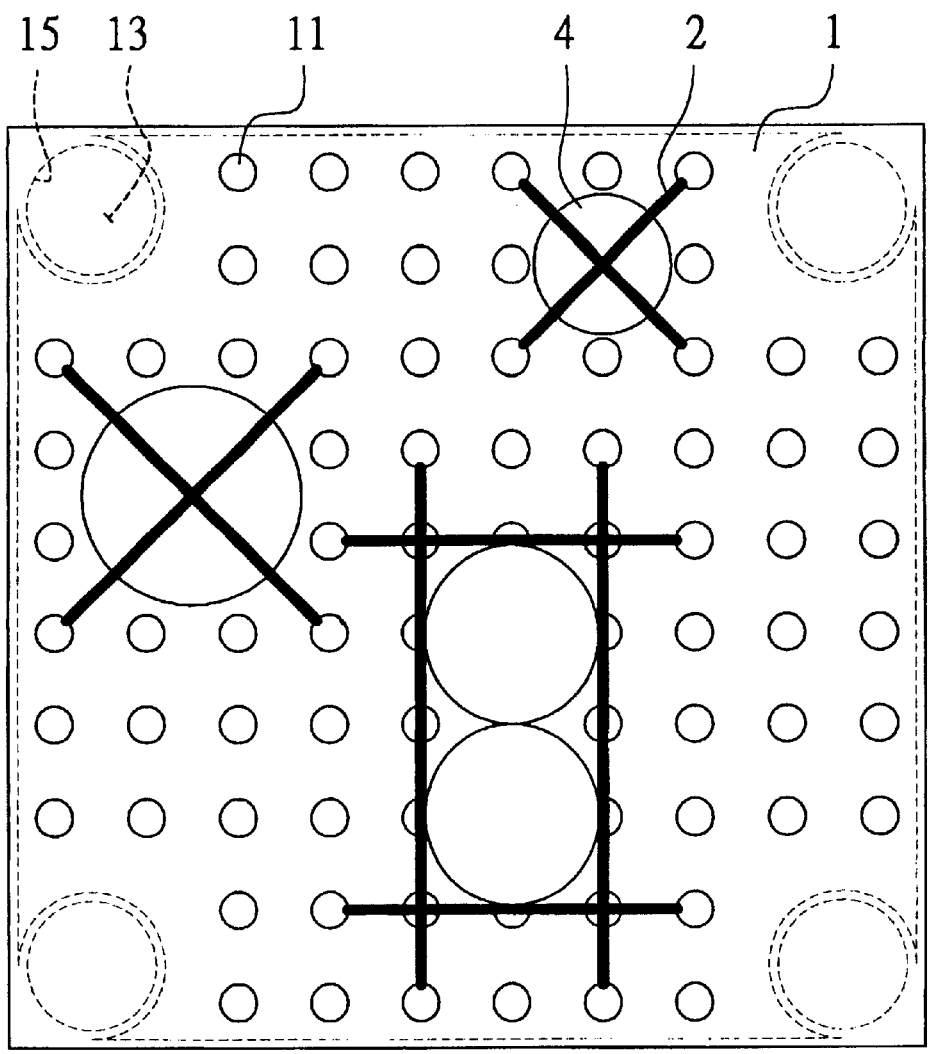
FIG. 1 is an upper view of an article steadying board in the present invention, showing ropes binding on articles placed on the board by means of hooks.
Figure 2:
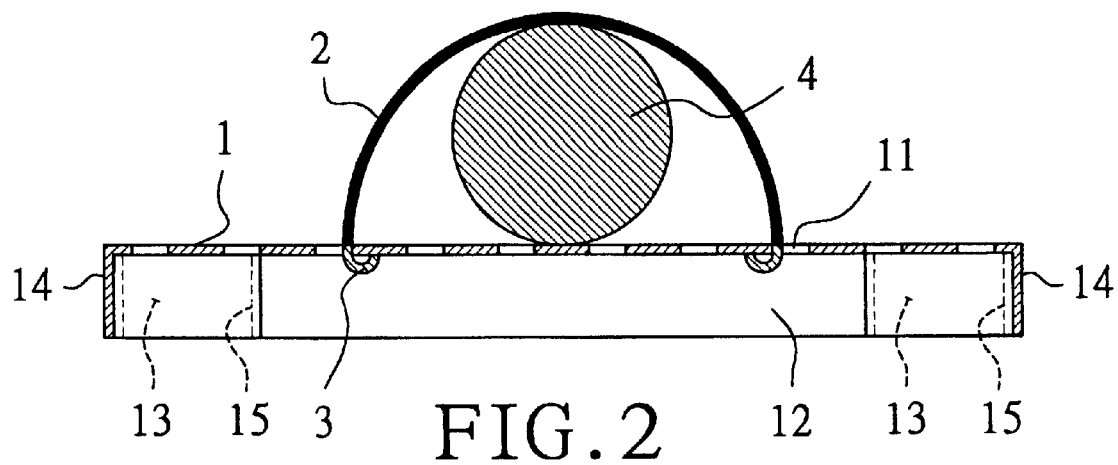
FIG. 2 is a side cross sectional view of the article steadying board in the present invention, showing an article steadied on the board.
Figure 3:
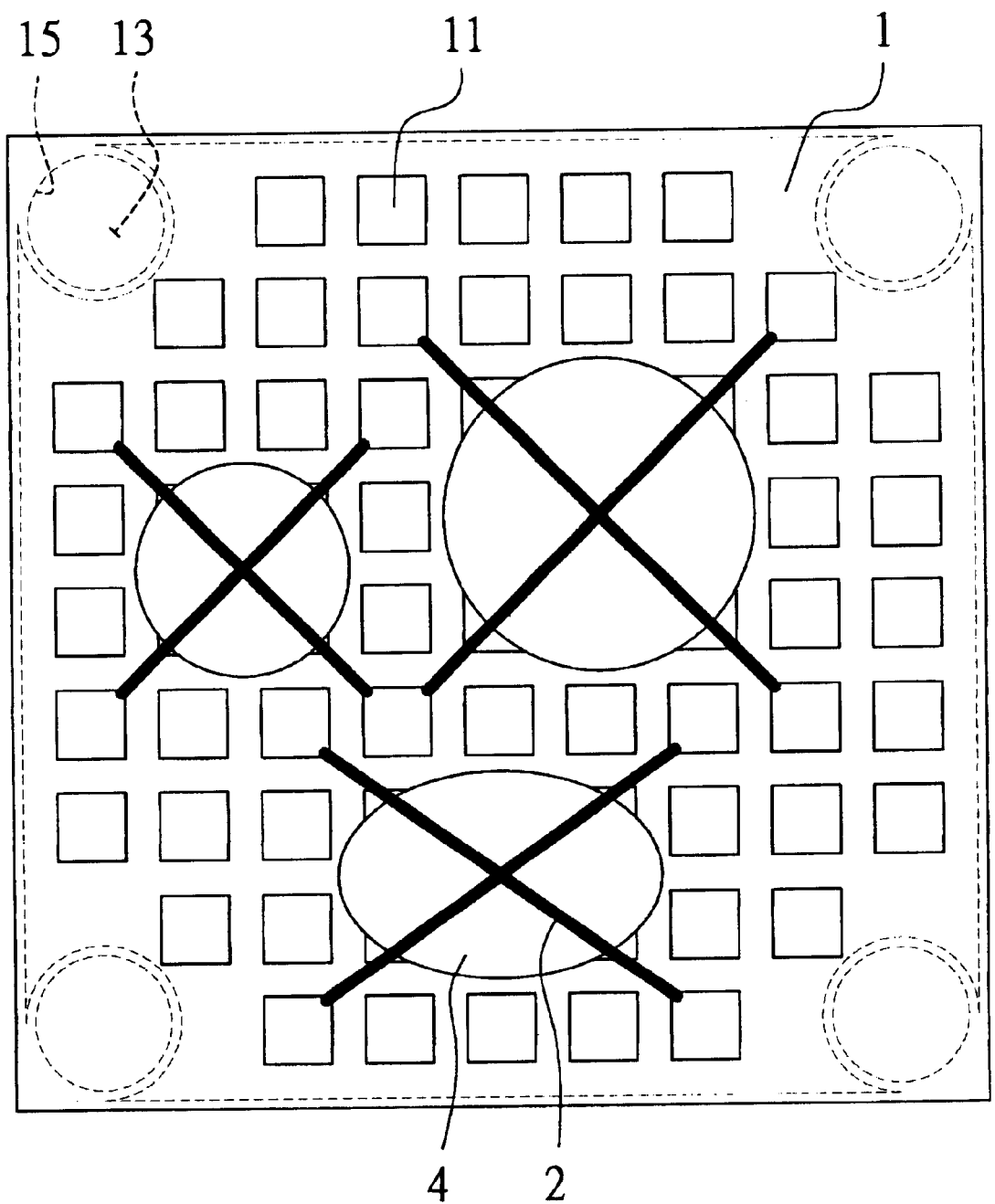
FIG. 3 is an upper view of an article steadying board in the present invention, showing through holes of a different shape from that shown in FIG. 1.

A preferred embodiment of an article steadying board in the present invention, as shown in FIG. 1, includes a board 1, a plurality of elastic ropes 2, and a plurality of hooks 3 respectively connected with two ends of each rope 2.

The board 1 is made to have a preset width and length and to have a plurality of through holes 11 regularly or irregularly spaced apart for the hooks 3 of the ropes 2 to hook therein for stably binding articles 4 placed on the board 1, which may be positioned in a warehouse or a vehicle. The board 1 further has a circumferential wall 14 extending vertically down from the outer periphery to form a recessed space 12 for convenience of positioning the board on the ground of a flat level. Thus, articles 4 of various shapes or sizes may be stabilized for storing or transporting by the board 1, the ropes 2 and the hooks 3, which are possible to hook any of the many through holes 11.

Therefore, the article steadying board in the invention can keep articles of various shapes and sizes in a stabilized condition for storing or transporting, very easy and convenient to handle, and overcomes the disadvantage of such complicated handling of the conventional steadying device described above.

Figure 4:
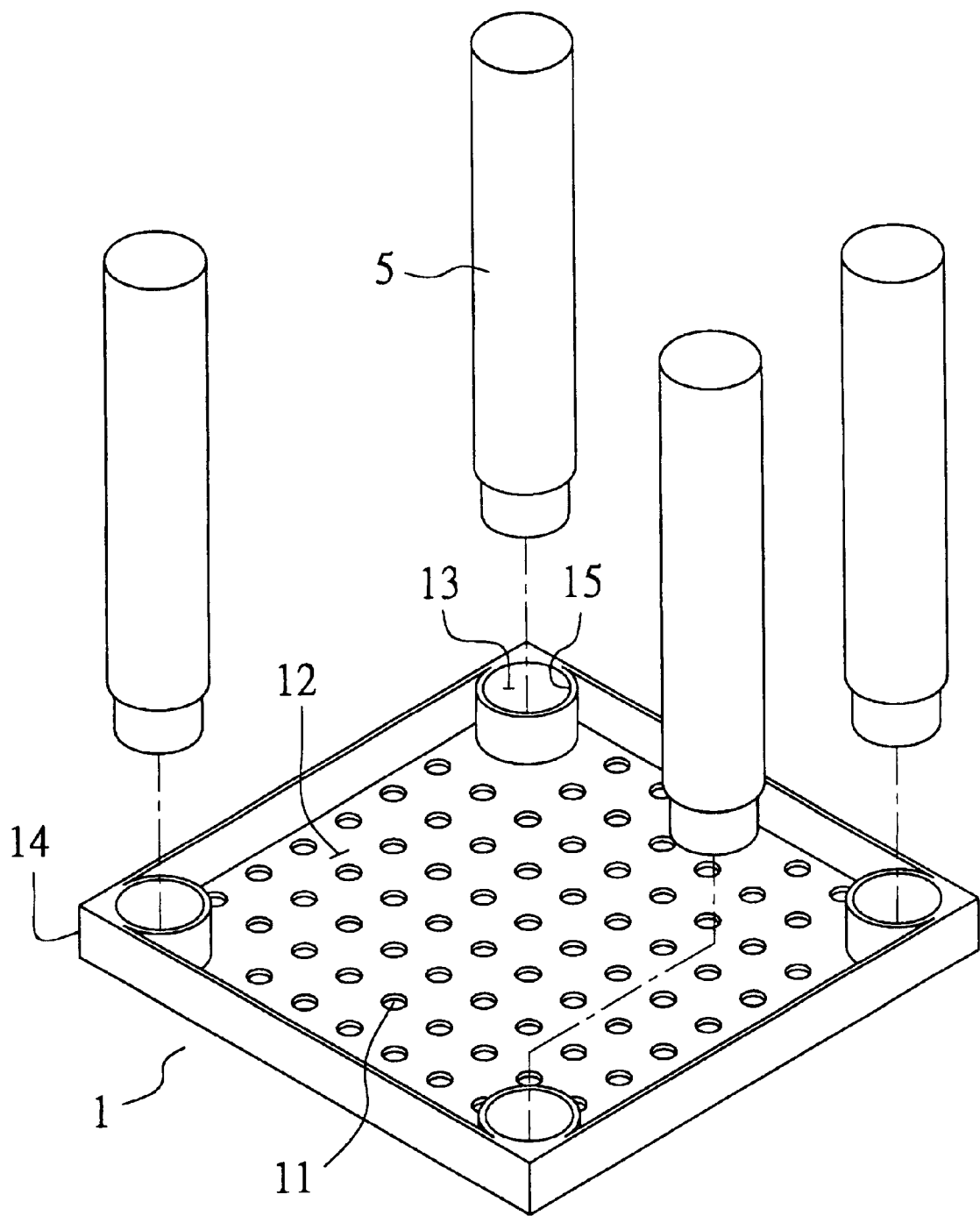
FIG. 4 is an exploded perspective view of an article steadying board the present invention, showing it combined with four feet to form a table; and, FIG. 5 is a perspective view of the article steadying board combined with four feet to form a table in the present invention.
Figure 5:
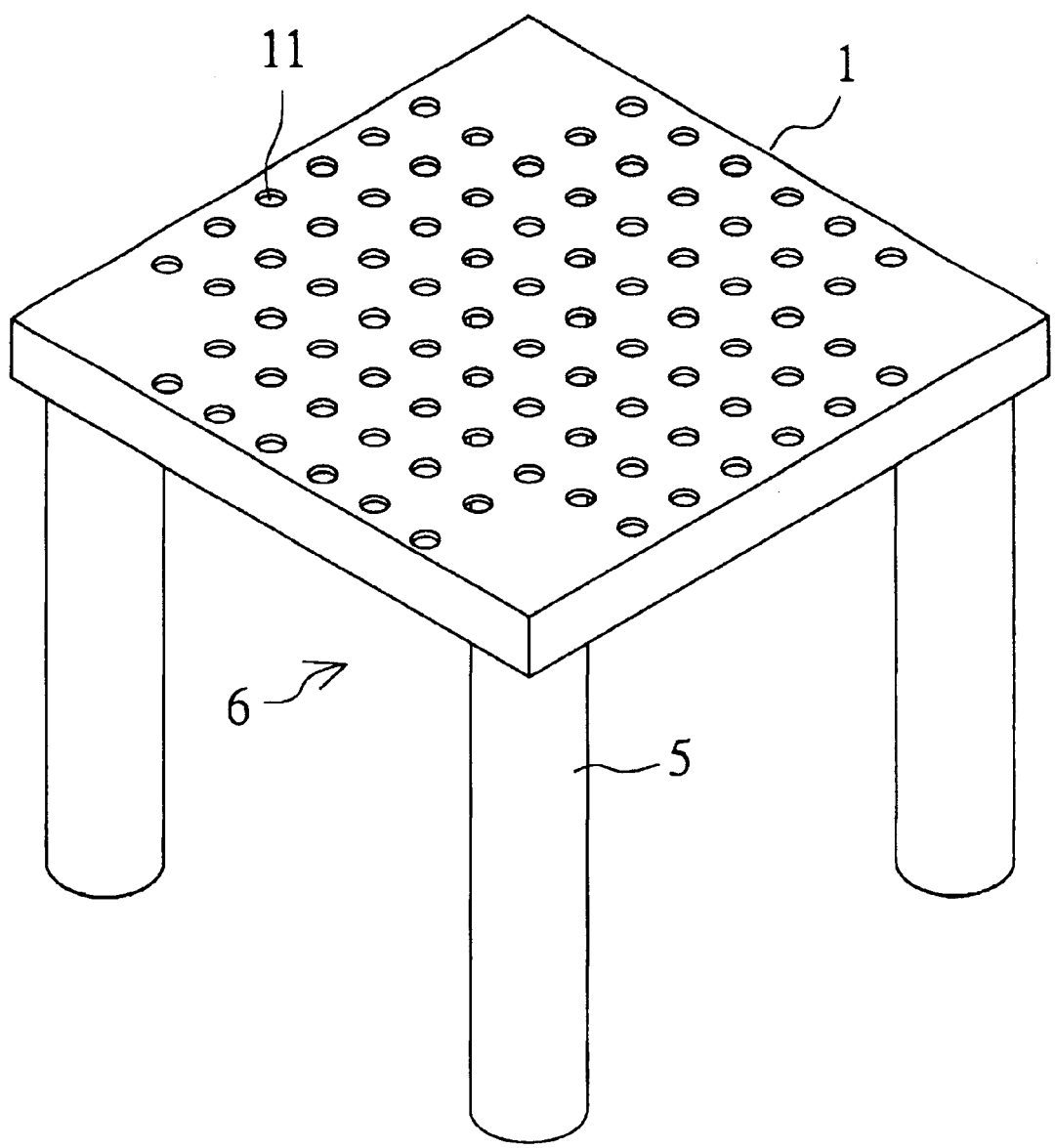

Further, the article steadying board can be made to form a table 6 by additionally forming an annular vertical wall 15 in each corner of the board 1 so that the annular vertical wall 15 may define a foot hole 13 for one of four round feet 5 to fit firmly therein to form the table 6, as shown in FIGS. 4 and 5. Thus, the article steadying board may have another function by adding a little simple structure.

While the preferred embodiment of the invention has been described above, it will be recognized and understood that various modifications may be made therein and the appended claims are intended to cover all such modifications that may fall within the spirit and scope of the invention.

What is claimed is:

1. An article steadying board comprising:

a board of a preset width and length having a plurality of through holes regularly or irregularly spaced apart and an outer circumferential wall extending vertically down from an outer periphery, said outer circumferential wall defining a recessed space;

articles of various shades and sizes; and a plurality of elastic ropes for binding the articles on an upper surface of said board, each said rope having two ends respectively connected firmly with a hook, with each hook able to hook any of said through holes for steadying one of said articles, and the articles being placed on said board and bound by said ropes with said hooks hooking the trough holes near the profile of the article for steadying the article stably on the ground of a warehouse for storing or on a vehicle for transporting.

2. The article steadying board as claimed in claim 1, wherein said board further has an annular vertical wall formed in each corner of said recess space for one of four round feet to fit firmly therein to form a table.

* * * * *